(12) United States Patent
Kime

(10) Patent No.: US 10,932,404 B2
(45) Date of Patent: Mar. 2, 2021

(54) SEMI-CLOSED LOOP HYDRAULIC SYSTEM FOR MATERIAL APPLICATION MACHINES

(71) Applicant: DHG, Inc., Fairfield, OH (US)

(72) Inventor: Aaron Andrew Kime, Liberty Township, OH (US)

(73) Assignee: DHG, Inc., Fairfield, OH (US)

( * ) Notice: Subject to any disclaimer, the term of this patent is extended or adjusted under 35 U.S.C. 154(b) by 186 days.

(21) Appl. No.: 16/114,895

(22) Filed: Aug. 28, 2018

(65) Prior Publication Data

US 2019/0090407 A1 Mar. 28, 2019

Related U.S. Application Data

(60) Provisional application No. 62/562,833, filed on Sep. 25, 2017.

(51) Int. Cl.
| | | |
|---|---|---|
| *A01B 63/10* | (2006.01) | |
| *A01C 7/00* | (2006.01) | |
| *A01C 19/00* | (2006.01) | |
| *A01C 7/08* | (2006.01) | |
| *F15B 7/00* | (2006.01) | |

(52) U.S. Cl.
CPC .......... *A01B 63/1006* (2013.01); *A01C 7/004* (2013.01); *A01C 7/084* (2013.01); *A01C 19/00* (2013.01); *F15B 7/006* (2013.01); *F15B 2211/20576* (2013.01); *F15B 2211/613* (2013.01); *F15B 2211/615* (2013.01); *F15B 2211/62* (2013.01); *F15B 2211/7058* (2013.01)

(58) Field of Classification Search
CPC ............ F16H 61/4148; F16H 61/4078; F16H 61/4165; F16H 61/4139; F16H 61/4183; F15B 2211/613; A01C 15/04; A01C 7/004
USPC ............................................ 111/127; 60/456
See application file for complete search history.

(56) References Cited

U.S. PATENT DOCUMENTS

| | | | | |
|---|---|---|---|---|
| 5,012,974 | A * | 5/1991 | Johnson ................. | A01C 7/004 239/1 |
| 5,615,553 | A * | 4/1997 | Lourigan .............. | F15B 11/162 60/422 |
| 5,918,558 | A * | 7/1999 | Susag ................... | F15B 11/162 111/200 |

OTHER PUBLICATIONS

Speed Control, Speed Control in the Sewer [online]. Müller Umwelttechnik Gmbh & Co. KG, 2019 [retrieved on Feb. 7, 2019]. Retrieved from the Internet: <URL http://mueller-umwelt.de/index.php?id=88&L=1>.

Thorough and Effective Faun Sweepers [online]. Faun Umwelttechnik Gmbh & Co. KG, 2018 [retrieved on Feb. 7, 2019]. Retrieved from the Internet: <URL https://www.faun.com/en/products/sweepers/>.

* cited by examiner

*Primary Examiner* — Michael Leslie
*Assistant Examiner* — Michael Quandt
(74) *Attorney, Agent, or Firm* — Dinsmore & Shohl LLP

(57) ABSTRACT

A semi-closed loop hydraulic circuit includes a prime move, a first hydraulic circuit operatively coupled to the prime mover, and a second hydraulic circuit operatively coupled to the prime mover. The second hydraulic circuit is fluidly coupled to the first hydraulic circuit.

17 Claims, 2 Drawing Sheets

SEMI-CLOSED LOOP HYDRAULIC SYSTEM FOR MATERIAL APPLICATION MACHINES

CROSS-REFERENCE TO RELATED APPLICATION

This application claims the benefit of priority to U.S. Provisional Application Ser. No. 62/562,833 filed Sep. 25, 2017, and entitled "Improved Hydraulic System for Pneumatic Material Application Machines," the entirety of which is incorporated by reference herein.

TECHNICAL FIELD

The present specification generally relates to improved hydraulic systems for hydraulic and pneumatic material application machines and, more specifically, semi-closed loop hydraulic systems material application machines such as bark blowers and hydroseeders.

BACKGROUND

Hydroseeding (or hydraulic mulch seeding, hydro-mulching, hydraseeding) is a planting process that uses a slurry of water, seed, mulch and fertilizer. The slurry is transported in a housing, either truck-mounted or trailer-mounted and sprayed over prepared ground in a uniform layer. Alternatively, helicopters and aircraft can be used where larger areas must be covered, such as, for example, burned wilderness areas after a fire. A hydroseeder uses a material pump, typically centrifugal or vortex, which draws the slurry from a mixing tank, increases its pressure, and supplies the slurry to the discharge pipe for application to the prepared ground. There are alternative methods for supplying power to the material pump.

For example, the material pump can be powered via a direct mechanical coupling to a prime mover (e.g., an internal combustion engine). The mechanical coupling may consist of an over-center style clutch that engages or disengages the material pump from the prime mover. In such instances, the pump and prime mover are typically in-line (i.e., share a common axis of rotation).

In another example, the material pump can be powered via an indirect mechanical coupling to the prime mover. In such instances, a series of belts and sheaves are used to transfer power from the prime mover to the material pump. In some instances, an intermediate shaft fitted with a clutch can be used to engage or disengage the material pump from the prime mover. In such instances, the material pump and the prime mover are not in-line.

A third example includes a pump that is powered via a closed-loop hydraulic system. For example, a hydrostatic hydraulic pump is fitted to the prime mover. The outlet of the hydraulic pump goes to the inlet of a hydraulic motor fitted to the material pump to perform the work. The outlet of the hydraulic motor goes directly back to the inlet of the hydrostatic pump. The hydrostatic hydraulic pump may incorporate an integral charge pump that draws oil from a reservoir which supercharges the hydrostatic loop to make up for pump and/or motor leakage while also providing pilot pressure for the hydrostatic pump's operation.

Barkblowers can include similar power transfer methods as discussed above in regards to hydroseeders. However, instead of driving a material pump, the driven element is a pneumatic blower.

Unfortunately, the above described power transfer methods can be large and/or bulky. Moreover, charge pumps are not able to be separately specified.

Accordingly, a need exists for alternative mechanical circuits to transfer power between the prime mover and a driven actuator (e.g., a material pump or pneumatic blower) with less waste and greater variability.

SUMMARY

Embodiments of the presell disclosure meet this need for improved power transfer with greater efficiency.

In one embodiment, a semi-closed loop hydraulic circuit includes a prime mover, a first hydraulic circuit operatively coupled to the prime mover, and a second hydraulic circuit operatively coupled to the prime mover. The second hydraulic circuit is fluidly coupled to the first hydraulic circuit.

In another embodiment, a material application machine includes a reservoir, a discharge pipe fluidly coupled to the reservoir, and a semi-closed loop hydraulic circuit configured to supply an application material within the reservoir to the discharge pipe. The semi-closed loop hydraulic circuit includes a prime mover, a first hydraulic circuit operatively coupled to the prime mover, and a second hydraulic circuit operatively coupled to the prime mover. The second hydraulic circuit is fluidly coupled to the first hydraulic circuit.

In another embodiment, a hydroseeder includes a mixing tank, a discharge pipe fluidly coupled to the mixing tank, and a semi-closed loop hydraulic circuit configured to supply a slurry within the mixing tank to the discharge pipe. The semi-closed loop hydraulic circuit includes a prime mover, a first hydraulic circuit operatively coupled to the prime mover, and a second hydraulic circuit operatively coupled to the prime mover. The second hydraulic circuit is fluidly coupled to the first hydraulic circuit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure is directed to a semi-closed loop hydraulic system that is applicable to hydroseeders and barkblowers. A hydroseeder is a device that uses a material pump, typically centrifugal or vortex, which draws a slurry of at least one of water, seed, mulch and fertilizer from a mixing tank, increases its pressure, and supplies the slurry to the discharge pipe for application to prepared ground. A barkblower is similar to a hydroseeder except instead of using a material pump, a pneumatic blower draws mulch from a reservoir and delivers it to a desired location, such as a flowerbed. However, it is contemplated that the disclosed semi-closed loop hydraulic system may be applicable to other applications, as well. The semi-closed loop hydraulic circuit includes a prime mover (e.g., an engine), a first hydraulic circuit operatively coupled to the prime mover, and a second hydraulic circuit operatively coupled to the prime mover, wherein the second hydraulic circuit is fluidly coupled to the first hydraulic circuit. The first hydraulic circuit includes a first hydraulic pump operatively coupled to the prime mover and a driven actuator (e.g., a material pump or pneumatic blower) fluidly coupled to the first hydraulic pump. The second hydraulic circuit includes a hydraulic fluid reservoir and a second hydraulic pump fluidly coupled to the hydraulic fluid reservoir and operatively coupled to the prime mover. By providing a semi-closed loop hydraulic system as disclosed herein, the second hydraulic circuit supercharges the first hydraulic circuit while also powering other machine functions. This also allows the first and second hydraulic pumps to be separately specified so that their size and operating parameters are not limited by one another.

Figure 1:
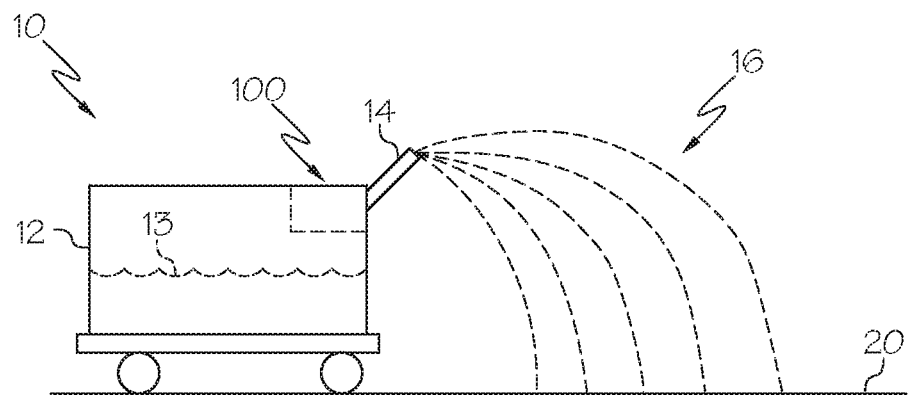
FIG. 1 depicts a material application machine having a semi-closed loop hydraulic circuit, according to one or more embodiments shown and described herein.

Referring now to FIG. 1, a material application machine 10 is generally depicted. The material application machine 10 may be for example, and as described above a hydroseeder, bark blower, or the like that is used to apply application material(s) to a location. The material application machine 10 may include a reservoir 12 that is configured to hold the application material 13. In hydroseeders the reservoir 12 is a mixing tank that mixes a material slurry of, for example, water, seed, mulch fertilizer, or any combination thereof. A discharge pipe 14 may be fluidly coupled to the reservoir 12. As noted above, application material 13 may be drawn from the reservoir 12 and passed through the discharge pipe 14 for application of the application material 13 to a surface 20 (e.g., ground, flowerbed, etc.) in need of seeding, mulching, or other application materials. That is, the discharge pipe 14 provides an output 16 (or spray) of the application material 13 to the surface 20.

To pump or otherwise move the application material 13 from the reservoir 12 to the discharge pipe 14, the material application machine 10 includes a semi-closed loop hydraulic system 100.

Figure 2:
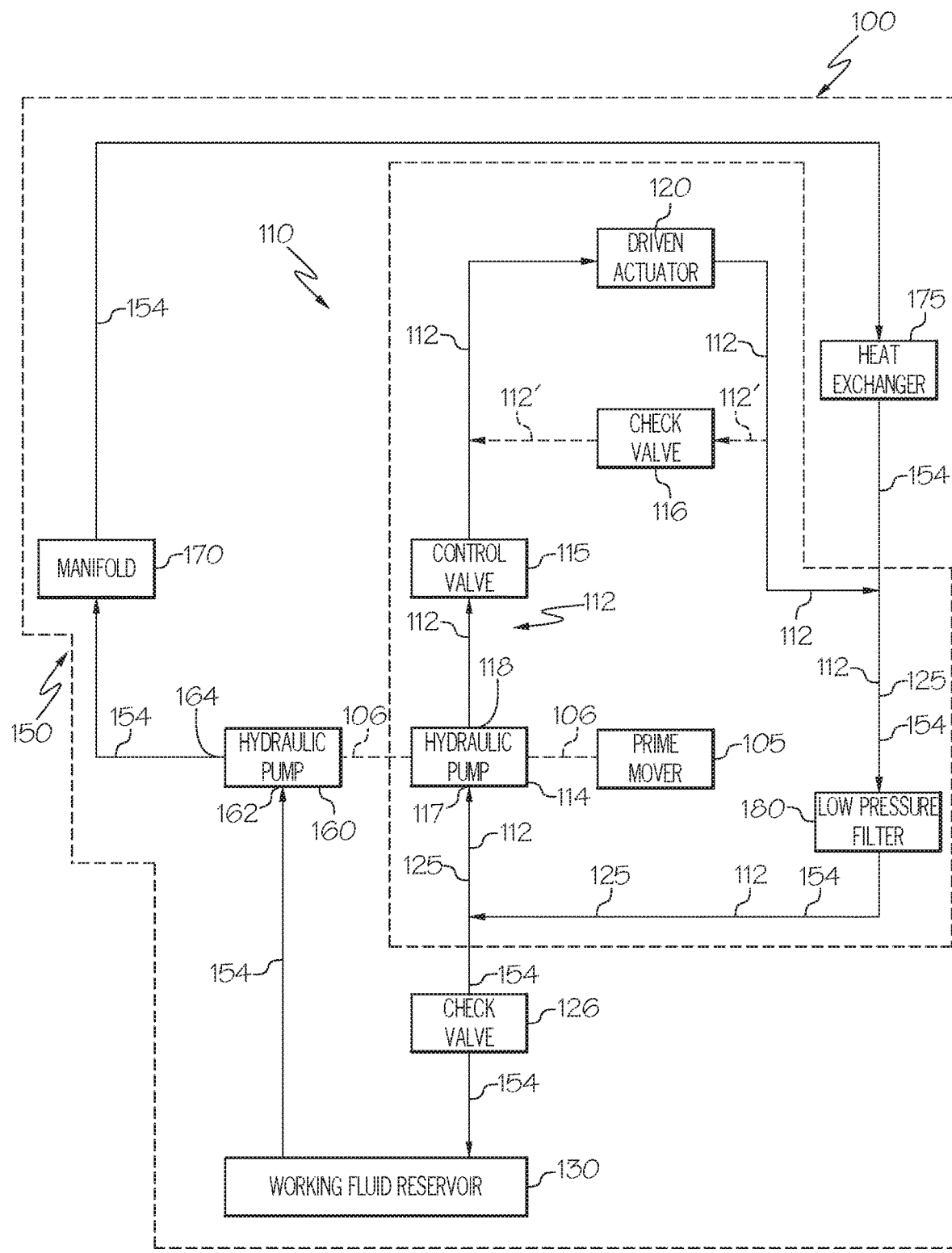
FIG. 2 schematically depicts the semi-closed loop hydraulic circuit of FIG. 1, according to one or more embodiments shown and described herein.

Referring now to FIG. 2, the semi-closed loop hydraulic system 100 is schematically depicted. It is noted that the semi-closed loop hydraulic system 100 can have a fewer or greater number of components than shown and described herein. The semi-closed loop hydraulic system 100 includes a prime mover 105, a first hydraulic circuit 110, and a second hydraulic circuit 150. As noted herein and as will be described in greater detail, the second hydraulic circuit 150 is fluidly coupled to the first hydraulic circuit 110 such that the fluid flow from the second hydraulic circuit 150 is combined with that of the first hydraulic circuit 110.

The prime mover 105 is operatively coupled to driven components of the first and second hydraulic circuits 110, 150 to move working fluid (e.g., hydraulic fluid) through the first and second hydraulic circuits 110, 150. Specifically, as will be described in greater detail herein, the prime mover 105 may be operatively coupled to first and second hydraulic pumps 114, 160 of the first and second hydraulic circuits 110, 150, so as to drive the first and second hydraulic pumps 114, 160. As such, the prime mover 105 may be any device capable of driving a hydraulic pump. For example, the prime mover 105 may be an internal combustion engine. The prime mover 105 may be directly mechanically coupled to the first and second hydraulic pumps 114, 160 through a rotatable shaft 106 or through various shafts and gear trains so that the rotation of hydraulic pumps may be independently specified.

The first hydraulic circuit 110 is a semi-closed loop circuit. Traditional closed loop hydraulic circuits circulate working fluid between the hydraulic pump and driven actuator and return the working fluid to the inlet of the hydraulic pump without returning or drawing more working fluid from a fluid reservoir. In contrast, open loop circuits draw working fluid from a reservoir and return the remaining fluid, after it travels through the open loop circuit back to the reservoir. In the present embodiment, the first hydraulic circuit 110 circulates working fluid within the first hydraulic circuit 110 from an outlet 118 of the first hydraulic pump 114, through a flow path 112, and returns the working fluid to an inlet 117 of the first hydraulic pump 114 without first being returned to a working fluid reservoir 130, as with traditional closed loop hydraulic circuits. However, the first hydraulic circuit 110 is not a completely closed loop circuit but is a semi-closed loop circuit because, as will be described in greater detail herein, the first fluid flow path 112 combines with a portion of a second fluid flow path 154 of the second hydraulic circuit 150 to create a combined fluid flow path 125, wherein working fluid from both the first fluid flow path 112 and the second fluid flow path 154 are combined before returning to an inlet 117 of the first hydraulic pump 114. It is noted that for clarity, combined flow path 125 is also labeled with reference numbers of the first fluid flow path 112 and the second fluid flow path 154, as the combined fluid flow path 125 forms a portion of the distinct first and second hydraulic circuits 110, 150. The various fluid flow paths may be provided by flexible hoses connecting the various components of the semi-closed loop hydraulic system 100.

As noted above, the first hydraulic circuit 110 includes the first hydraulic pump 114. The first hydraulic pump 114 may be any hydraulic pump capable of circulating working fluid through the first hydraulic circuit 110. For example, the first hydraulic pump 114 may be a fixed or variable displacement pump.

As described above, the prime mover 105 is operatively coupled to the first hydraulic pump 114 to drive operation of the first hydraulic pump 114. The prime mover 105 may be directly mechanically coupled to the first hydraulic pump 114 through a rotational shaft. In some embodiments, the prime mover 105 may transfer power to the first hydraulic pump 114 through a series of belts and sheaves. In yet further embodiments, the prime mover 105 may transfer power to the first hydraulic pump 114 using an intermediate shaft fitted with a clutch to engage or disengage the first hydraulic pump 114 from the prime mover 105. In any case, a pressure of the working fluid is increased as it passes from an inlet 117 of the first hydraulic pump 114 to an outlet 118 of the first hydraulic pump 114, allowing the first hydraulic pump 114 to circulate the working fluid through the fluid flow path 112.

The first hydraulic pump 114 is fluidly coupled to a driven actuator 120 through the fluid flow path 112 such that working fluid is provided to the driven actuator 120 by the first hydraulic pump 114. The driven actuator 120, for example, can be a motor for a material pump, such as used in a hydroseeder, that draws a slurry of, for example, water, seed, mulch, and fertilizer from a mixing tank (e.g., reservoir 12 illustrated in FIG. 1) and sprays said slurry onto prepared earth (e.g., surface 20 illustrated in FIG. 1). In another example, the driven actuator 120 can be a motor for a pneumatic blower that draws mulch from a reservoir (e.g., reservoir 12 illustrated in FIG. 1) and blows it into a specified place (e.g., surface 20 illustrated in FIG. 1) as directed by an operator. In some embodiments, the driven actuator 120 may be a motor coupled to a vacuum for sucking up material.

In some embodiments, the first hydraulic circuit 110 can include a control valve 115 fluidly coupled to the first hydraulic pump 114. The control valve 115 may be any type of open or closed center directional valve, depending on the type of pump used, such as, for example, a proportional flow control valve to control the flow of hydraulic fluid through the first hydraulic circuit 110. For example, the control valve 115 can adjust a speed and/or volume of working fluid which flows into the driven actuator 120. The control valve 115 meters the amount of hydraulic fluid flowing to the driven actuator 120. Specifically, the control valve 115 changes the operating speed of the driven actuator 120 independently from the speed of the first hydraulic pump 114 or the prime mover 105 speed. It could be any type of open or closed center directional valve, depending on the type of pump used. In some embodiments, there may not be a control valve 115 located between the first hydraulic pump 114 and the driven actuator 120.

In some embodiments, the first hydraulic circuit 110 can further include a check valve 116 that monitors a pressure of the working fluid within the first hydraulic circuit 110 and direct the flow of fluid accordingly. For example, when the driven actuator 120 is stopped suddenly (e.g., an operator turns off the driven actuator 120) the driven actuator 120 may have a lot of inertia, the check valve 116 may allow fluid to flow from the outlet of the driven actuator 120, through the check valve 116 along flow path 112', and back to the inlet of the driven actuator 120, providing a gradual braking function for the driven actuator 120.

As will be described in greater detail herein, fluid within the first fluid flow path 112 can exit from the driven actuator 120 to be directed through a combined fluid flow path 125 at a position downstream of the driven actuator 120. In this combined fluid flow path 125, working fluid from the first hydraulic circuit 110 is combined with working fluid from the second hydraulic circuit 150. The combined fluid flow path 125 may then direct the combined working fluid back to the inlet 117 of the first hydraulic pump 114.

A second check valve 126 may be positioned proximate to the inlet 117 of the first hydraulic pump 114. The second check valve 126 may operate such that any pressure greater than a predetermined amount is directed toward a working fluid reservoir 130 that is part of the second hydraulic circuit 150. The remaining working fluid is directed toward the inlet 117 of the first hydraulic pump 114. Thus combined fluid flow path 125 allows for leakage compensation from the first hydraulic circuit 110 provides the first hydraulic pump 114 with a pilot pressure so that the first hydraulic pump 114 can work at higher operating speeds. For example, a pilot pressure of about 5 psi may be provided. Any fluid providing a pressure within the combined fluid flow path 125 above the desired pilot pressure is directed into the fluid reservoir 130 of the second hydraulic circuit 150.

Referring specifically now to the second hydraulic circuit 150, the second hydraulic circuit 150 includes a second fluid flow path 154, a working fluid reservoir 130, and a second hydraulic pump 160 fluidly coupled to the working fluid reservoir 130 over the second fluid flow path 154 such the second hydraulic pump 160 draws working fluid from the working fluid reservoir 130. The second hydraulic circuit 150 is an open loop circuit. As described above, an open loop circuit is a hydraulic circuit that draws working fluid from a working fluid reservoir 130 wherein the working fluid is then returned to the fluid reservoir 130 and not first directed back to an inlet 162 of the second hydraulic pump 160.

The prime mover 105 is operatively coupled to the second hydraulic pump 160 to drive operation of the second hydraulic pump 160. The prime mover 105 may be directly mechanically coupled to the second hydraulic pump 160 through a rotational shaft. In some embodiments, the prime mover 105 may transfer power to the second hydraulic pump 160 through a series of belts and sheaves. In yet further embodiments, the prime mover 105 may transfer power to the second hydraulic pump 160 using an intermediate shaft fitted with a clutch to engage or disengage the second hydraulic pump 160 from the prime mover 105. In some embodiments, the second hydraulic pump 160 is coupled to and in line with the first hydraulic pump 114, such that both the first hydraulic pump 114 and the second hydraulic pump 160 run at the same speed. In some embodiments, the second hydraulic pump 160 and the first hydraulic pump 114 are coupled to one another through a gear box, to allow the second hydraulic pump 160 and the first hydraulic pump 114 to operate at different speeds. In this way, the first hydraulic pump 114 and the second hydraulic pump 160 can be individually specified for the particular application. In any case, a pressure of the working fluid is increased as it passes from an inlet 162 of the second hydraulic pump 160 to an outlet 164 of the second hydraulic pump 160, allowing the second hydraulic pump 160 to circulate the working fluid through the second fluid flow path 154. In some embodiments, the second pump may be smaller than the first pump.

As noted above, the second hydraulic circuit 150 is fluidly coupled to the first hydraulic circuit 110 such that the flows of working fluid from the first and second hydraulic circuits 110, 150 are mixed prior to the fluid returning to the inlet of the first hydraulic circuit 110. In this way, the second hydraulic pump 160 can provide an additional charge (e.g., additional fluid flow) to compensate for pump and motor leakage while also supercharging the inlet 117 of the first hydraulic pump 114 to allow the first hydraulic pump 114 to operate at higher rotational speeds. Specifically, the first hydraulic pump 114 is able to operate at higher rotational speeds than it otherwise could without the additional charge provided by the second hydraulic pump 160. As described above, using the second check valve 126, excess charge flow that is not required for leakage compensation may be directed back to the working fluid reservoir 130 at relatively low pressures.

In some embodiments, the second hydraulic pump 160 is fluidly coupled to a hydraulic valve manifold 170 over the second fluid flow path 154 for controlling ancillary functions of the device which incorporates the semi-closed loop hydraulic system 100. Such ancillary functions may include, but are not limited to material preparation or movement prior to introduction to the driven actuator 120. For example, in the case where the driven actuator 120 is a pneumatic blower, the second hydraulic circuit 150 may include an agitator to agitate the material to keep it from clumping, and move it to discharge via belts, chain drags, walking floors, or the like. Where driven actuator 120 is a material pump on a hydroseeder, the agitator may mix the slurry. In some embodiments, an ancillary function may include operation of an automated hose reel. In yet further embodiments, an ancillary function may be control of a device for grinding mulch bales prior to mixing.

After performing the ancillary functions, if any, the working fluid in the second fluid flow path 154 may be directed through a heat exchanger 175 to cool the hydraulic fluid prior to mixing it with the fluid from the first hydraulic circuit 110. When hydraulic fluid flows through the second flow path 154 and performs any ancillary functions, heat may be generated due to friction within the fluid and other components. A heat exchanger 175 may keep hydraulic fluid temperatures from rising to levels that may cause it to break down. In some embodiments, there may not be a heat exchanger 175.

As described herein, upon leaving the heat exchanger 175, the flow from the second hydraulic circuit 150 is combined with the flow from the first hydraulic circuit 110. The combined flow volume may then be directed through a low pressure filter 180. The low pressure filter 180 may remove some contaminants from the working fluid that was picked up along the first and second fluid flow paths 112, 154. In typical closed loop hydraulic circuits, both sides of the circuit (at the pump inlet and outlet) are at elevated pressures to prevent cavitation. Such elevated pressures typically require a filter rated for such pressures. In the present semi-closed loop system 100, the filter is located downstream of the driven actuator 120, where the fluid pressure is lower (about less than 50 psi). As such, a filter rated for such lower pressures may be used. Low pressure filters are lighter and tend to be less expensive.

As noted above, the combined flow may then be directed through a second check valve 126, wherein any pressure greater than a predetermine pressure (e.g., about 5 Psi) is directed back into the working fluid reservoir 130. The remainder of the working fluid is directed back toward the inlet 117 of the first hydraulic pump 114. Hence, any losses of hydraulic fluid from the first hydraulic circuit 110 may be compensated from the combined fluid flow from the first and second hydraulic circuits 110, 150.

Such semi-closed loop hydraulic systems as described herein provide many benefits. As noted above, the various components of the first and second hydraulic circuits 110, 150 may be fluidly coupled to one another through flexible hydraulic hoses. This allows for the relative positions of the driven actuator 120 and the prime mover 105 to be more flexible because there is no direct mechanical coupling between the driven actuator 120 and the prime mover 105. Furthermore, when the driven actuator 120 is mechanically driven, versus hydraulically driven, its rotational speed is directly proportional to the rotational speed of the prime mover 105. Using the semi-closed loop hydraulic system 100 as described herein, the speed of the driven actuator 120 can be independently controlled from the speed of the prime mover 105. Further benefits achieved include cost reductions from being able to use low pressure filters versus high pressure filters. Weight reductions can be had due to the various flexible connections between the different components versus heavier mechanical couplings. Furthermore, the second hydraulic pump 160 can be used to control ancillary functions whereas in a typical closed loop hydraulic circuit, such charge pumps would not be able to perform ancillary functions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A semi-closed loop hydraulic system comprising:
    a prime mover;
    a first hydraulic circuit operatively coupled to the prime mover; and
    a second hydraulic circuit operatively coupled to the prime mover, wherein the second hydraulic circuit is fluidly coupled to the first hydraulic circuit, wherein a combined fluid flow path of the first fluid circuit and the second fluid circuit are directed through a low pressure filter rated for a pressure of less than 50 psi.

2. The semi-closed loop hydraulic system of claim 1, wherein the first hydraulic circuit comprises:
    a first hydraulic pump operatively coupled to the prime mover; and
    a driven actuator fluidly coupled to the first hydraulic pump.

3. The semi-closed loop hydraulic system, of claim 2, wherein the second hydraulic circuit comprises:
    a working fluid reservoir; and
    a second hydraulic pump fluidly coupled to the working fluid reservoir and operatively coupled to the prime mover.

4. The semi-closed loop hydraulic system of claim 2, wherein a first fluid flow path of the first hydraulic circuit and a second fluid flow path of the second hydraulic circuit combine into a combined fluid flow path at a position downstream of the driven actuator.

5. The semi-closed loop hydraulic system of claim 4, wherein the combined fluid flow path is directed toward a check valve, wherein fluid flow having a pressure greater than a predetermined pressure is directed into the second hydraulic circuit and a remaining working fluid is directed toward an inlet of the first hydraulic pump.

6. A material application machine comprising:
    a reservoir;
    a discharge pipe fluidly coupled to the reservoir; and
    a semi-closed loop hydraulic circuit comprising:
        a prime mover;
        a first hydraulic circuit operatively coupled to the prime mover and comprising a first hydraulic pump operatively coupled to the prime mover and a driven actuator fluidly coupled to the first hydraulic pump, the driven actuator configured to supply application material within the reservoir to the discharge pipe; and
        a second hydraulic circuit operatively coupled to the prime mover, wherein the second hydraulic circuit is fluidly coupled to the first hydraulic circuit, a combined fluid flow path of the first fluid circuit and the second fluid circuit are directed through a low pressure filter rated for a pressure of less than 50 psi.

7. The material application machine of claim 6, wherein the driven actuator is one of a material pump or a blower.

8. The material application machine of claim 6, wherein the second hydraulic circuit comprises:
    a working fluid reservoir; and
    a second hydraulic pump fluidly coupled to the working fluid reservoir and operatively coupled to the prime mover.

9. The material application machine of claim 6, wherein a first fluid flow path of the first hydraulic circuit and a second fluid flow path of the second hydraulic circuit combine into the combined fluid flow path at a position downstream of the driven actuator.

10. The material application machine of claim 9, wherein the combined fluid flow path is directed toward a check valve, wherein fluid flow having a pressure greater than a predetermined pressure is directed into the second hydraulic circuit and a remaining working fluid is directed toward an inlet of the first hydraulic pump.

11. The material application machine of claim 6, wherein the first hydraulic circuit comprises a heat exchanger, and a first fluid flow path of the first hydraulic circuit and a second fluid flow path of the second hydraulic circuit combine into the combined fluid flow path at a position downstream of the heat exchanger.

12. A hydroseeder comprising:
a mixing tank;
a discharge pipe fluidly coupled to the mixing tank; and
a semi-closed loop hydraulic circuit comprising:
  a prime mover;
  a first hydraulic circuit operatively coupled to the prime mover and comprising a first hydraulic pump operatively coupled to the prime mover and a driven actuator fluidly coupled to the first hydraulic pump, the driven actuator configured to supply a slurry within the mixing tank to the discharge pipe; and
  a second hydraulic circuit operatively coupled to the prime mover, wherein the second hydraulic circuit is fluidly coupled to the first hydraulic circuit, a combined fluid flow path of the first fluid circuit and the second fluid circuit are directed through a low pressure filter rated for a pressure of less than 50 psi.

13. The hydroseeder of claim 12 wherein the driven actuator is a material pump.

14. The hydroseeder of claim 12, wherein the second hydraulic circuit comprises:
a working fluid reservoir; and
a second hydraulic pump fluidly coupled to the working fluid reservoir and operatively coupled to the prime mover.

15. The hydroseeder of claim 12, wherein a first fluid flow path of the first hydraulic circuit and a second fluid flow path of the second hydraulic circuit combine into the combined fluid flow path at a position downstream of the driven actuator.

16. The hydroseeder of claim 15, wherein the combined fluid flow path is directed toward a check valve, wherein fluid flow having a pressure greater than a predetermined pressure is directed into the second hydraulic circuit and a remaining working fluid is directed toward an inlet of the first hydraulic pump.

17. The hydroseeder of claim 12, wherein the first hydraulic circuit comprises a heat exchanger, and a first fluid flow path of the first hydraulic circuit and a second fluid flow path of the second hydraulic circuit combine into the combined fluid flow path at a position downstream of the heat exchanger.

* * * * *